(12) United States Patent
Ramirez et al.

(10) Patent No.: US 9,743,759 B1
(45) Date of Patent: Aug. 29, 2017

(54) TRAVELING TABLET

(71) Applicants: Tony Ramirez, North Edwards, CA (US); Theresa Ramirez, North Edwards, CA (US)

(72) Inventors: Tony Ramirez, North Edwards, CA (US); Theresa Ramirez, North Edwards, CA (US)

(*) Notice: Subject to any disclaimer, the term of this patent is extended or adjusted under 35 U.S.C. 154(b) by 0 days.

(21) Appl. No.: 15/241,061

(22) Filed: Aug. 18, 2016

Related U.S. Application Data

(60) Provisional application No. 62/207,827, filed on Aug. 20, 2015.

(51) Int. Cl.
  *A47B 23/04* (2006.01)
  *A47B 97/08* (2006.01)
  *F16M 13/00* (2006.01)
  *F16M 11/28* (2006.01)
  *F16M 11/10* (2006.01)

(52) U.S. Cl.
  CPC .............. *A47B 23/04* (2013.01); *A47B 97/08* (2013.01); *F16M 11/10* (2013.01); *F16M 11/28* (2013.01); *F16M 13/00* (2013.01); *A47B 2023/049* (2013.01)

(58) Field of Classification Search
  CPC ........ F16M 11/10; F16M 11/28; F16M 13/00; A47G 1/143; A47B 23/04; A47B 23/00; A47B 23/043; A47B 23/044; A47B 97/08; A47B 2023/049; A47B 19/00; A47B 19/08

USPC .... 248/451, 441.1, 447, 448, 454, 457, 460, 248/463, 464, 558
  See application file for complete search history.

(56) References Cited

U.S. PATENT DOCUMENTS

| | | | | |
|---|---|---|---|---|
| 2,522,345 | A * | 9/1950 | Cashiopp | G10G 5/00 248/121 |
| 2,567,593 | A * | 9/1951 | Bemis | A47B 3/0818 108/148 |
| 4,494,754 | A * | 1/1985 | Wagner, Jr. | A63F 13/02 108/43 |
| 5,161,766 | A | 11/1992 | Arima | |
| 5,615,620 | A * | 4/1997 | Owen | A47B 23/04 108/150 |
| 6,123,309 | A * | 9/2000 | Sage | F16M 11/041 248/316.1 |
| 6,327,982 | B1 * | 12/2001 | Jackson | A47B 23/046 108/142 |
| 7,336,258 | B1 * | 2/2008 | Goetsch | F16M 11/14 248/278.1 |
| 8,651,446 | B2 | 2/2014 | Lausell | |
| 8,668,122 | B2 | 3/2014 | Case et al. | |

(Continued)

*Primary Examiner* — Anita M King
(74) *Attorney, Agent, or Firm* — RG Patent Consulting, LLC; Rachel Gilboy

(57) ABSTRACT

A portable, height adjustable support system for suspending electronic media, particularly tablet computers and smartphones, in a hands-free manner while riding in an automobile, or sitting in a chair or on a couch to provide a versatile accessory that actually holds the electronic device for the user, thus optimizing user-friendly usage of these devices, especially during long road trips, without the sore arms, wrists, and shoulders that can otherwise result from holding a device for a lengthy time period. The main or top stand of the Traveling Tablet is also detachable for use on any hard surface, such as a table or desktop.

10 Claims, 4 Drawing Sheets

(56) References Cited

U.S. PATENT DOCUMENTS

| | | | |
|---|---|---|---|
| 8,960,104 B2* | 2/2015 | Copeland | A47B 3/00 |
| | | | 108/117 |
| 9,062,819 B1* | 6/2015 | Chen | F16M 13/04 |
| 9,149,111 B1* | 10/2015 | Lin | A47B 3/0812 |
| 2006/0016945 A1* | 1/2006 | Taylor | A47B 19/06 |
| | | | 248/188.5 |

* cited by examiner

TRAVELING TABLET

CROSS-REFERENCE TO RELATED APPLICATION

The present application is related to and claims priority from prior provisional application Ser. No. 62/207,827, received in the Patent Office Aug. 20, 2015 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention. It is not an admission that any of the information provided herein is prior art, or material, to the presently described or claimed inventions, or that any publication or document that is specifically or implicitly referenced is prior art.

FIELD OF THE INVENTION

The present invention relates generally to the field of tablet PC easel's with leg attachments for hands free use and more specifically relates to a portable, height adjustable support system for suspending electronic media, particularly tablet computers and smartphones, in a hands-free manner while riding in an automobile, or sitting in a chair or on a couch to provide a versatile accessory that actually holds the electronic device for the user, thus optimizing user-friendly usage of these devices, especially during long road trips, without the sore arms, wrists, and shoulders that can otherwise result from holding a device for a lengthy time period.

DESCRIPTION OF THE RELATED ART

In the first years of the twenty-first century, the world is, without a doubt, in the computer age. Dependence on this technology has reached unprecedented levels as the entire corporate world, and many governments, rely on computer technology to help keep track of the world's money supply and the security of each nation. Additionally, the prevalence of computers in the workplace has reached a point that most firms require applicants to have at least some computer experience. In fact, over 66% of the U.S. workforce now uses a computer on the job daily, from receptionists answering computerized telephone systems and cashiers ringing up sales in Wal-Mart on registers that are tied into vast electronic databases to professionals creating detailed spreadsheets and many other fields relying on the Internet as a daily routine.

Computer technology has today evolved to encompass wireless communication, with ubiquitous mobile devices such as digital music players, electronic readers, and now sleek, portable tablet computers such as Apple's iPad providing access to the world at one's fingertips. However, as conveniently portable as the above items are, their use is not without a drawback. Particularly, when riding along in a motor vehicle during an especially long trip, users of these handheld devices must constantly bend the head and neck in order to see and operate the equipment. As can be imagined, prolonged positioning in this manner can result in painful headaches and neck strain. Moreover, the arms and hands can quickly grow tired and sore from continuously holding the items. As tablet computers, especially, can help keep both bored adults and restless children entertained with internet surfing, game play, and movie watching, the above disadvantages can turn a pleasant drive into a nightmare for all in the vehicle.

Various attempts have been made to solve problems found in tablet PC easel's with leg attachments for hands free use art. Among these are found in: U.S. Pat. No. 8,668,122 to Richard N. Case et al; U.S. Pat. No. 5,161,766 to Ronald H. Arima; and U.S. Pat. No. 8,651,446 to Emiliano Lausell. This prior art is representative of tablet PC easel's with leg attachments for hands free use.

None of the above inventions and patents, taken either singly or in combination, is seen to describe the invention as claimed. Thus, a need exists for a reliable Traveling Tablet, a portable, height adjustable support system for suspending electronic media, particularly tablet computers and smartphones, in a hands-free manner while riding in an automobile, or sitting in a chair or on a couch to provide a versatile accessory that actually holds the electronic device for the user, thus optimizing user-friendly usage of these devices, especially during long road trips, without the sore arms, wrists, and shoulders that can otherwise result from holding a device for a lengthy time period and to avoid the above-mentioned problems.

BRIEF SUMMARY OF THE INVENTION

In view of the foregoing disadvantages inherent in the known tablet PC easel's with leg attachments for hands free use art, the present invention provides a novel Traveling Tablet. The general purpose of the present invention, which will be described subsequently in greater detail, is to provide a portable, height adjustable support system for suspending electronic media, particularly tablet computers and smartphones, in a hands-free manner while riding in an automobile, or sitting in a chair or on a couch to provide a versatile accessory that actually holds the electronic device for the user, thus optimizing user-friendly usage of these devices, especially during long road trips, without the sore arms, wrists, and shoulders that can otherwise result from holding a device for a lengthy time period. The main or top stand of the Traveling Tablet is also detachable for use on any hard surface, such as a table or desktop. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, Traveling Tablet, constructed and operative according to the teachings of the present invention.

The various embodiments of the present invention will hereinafter be described in conjunction with the appended drawings, wherein like designations denote like elements.

DETAILED DESCRIPTION

Figure 1:
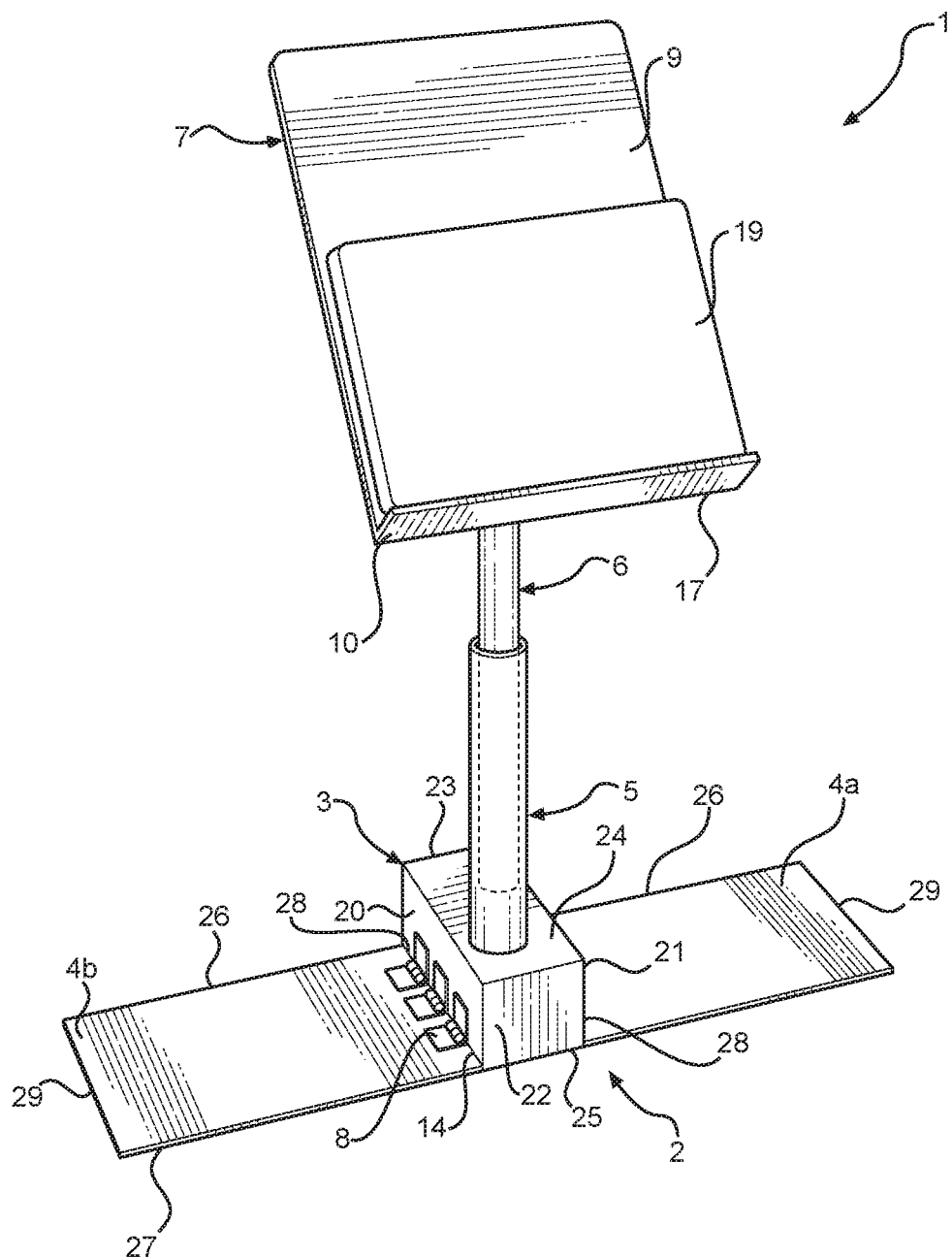
FIG. 1 shows a front perspective view illustrating a Traveling Tablet according to an embodiment of the present invention.

As discussed above, embodiments of the present invention relate to a tablet PC easel with leg attachments for hands free use and more particularly to a Traveling Tablet, a portable, height adjustable support system for suspending electronic media, particularly tablet computers and smartphones, in a hands-free manner while riding in an automobile, or sitting in a chair or on a couch to provide a versatile accessory that actually holds the electronic device for the user, thus optimizing user-friendly usage of these devices, especially during long road trips, without the sore arms, wrists, and shoulders that can otherwise result from holding a device for a lengthy time period.

Referring now to the drawings FIGS. 1-4, the Traveling Tablet comprising a novel product offering consumers a practical solution to the aforementioned challenges. As the name implies, the Traveling Tablet comprises a specially designed support system for suspending tablet computers (and more) in a vehicle (or other seated area), at eye level and in a hands-free manner Fabricated of durable materials, this product is presented as featuring a flat, padded, rectangular base with an integrated, centrally positioned vertical support stem that can be raised or lowered as needed. At the top of the stem, a swivel-mounted, adjustable table surface would complete the design.

Compact and lightweight, the Traveling Tablet offers overall dimensions of approximately fifteen and one half inches (15½") in height, thirteen and one half inches (13½") in base width, and eight inches (8") in depth. So as to accommodate any model of tablet computer, e-reader, or smartphone, the rectangular table surface measures seven and one half inches (7½") in height, and eight inches (8") in width and depth. Sheathed in a material that provides a non-skid surface for electronics, the tablet also boasts a raised lip at its bottom to help keep devices in place while the product is in use. As the unit offers a practical, inverted "T" base and stem, a user simply places a leg on either side of the stem, with feet on the flat boards and with their legs keeping the base in place and the stem extending upward, directly in front of the user, where one would normally hold a device. After raising or lowering the stem as desired, the user can adjust the angle of the table to a comfortable position. Additionally, the top stand can be easily detached and placed on any table or desktop in the home, office, or anywhere.

Conceived as a highly versatile, portable "docking station" for electronic media such as tablet computers and smartphones, the Traveling Tablet would provide an effortless, convenient means for consumers to use these devices in a virtually hands-free manner Able to enjoy reading the *New York Times*, playing Candy Crush Saga or Words With Friends, updating one's Facebook status, watching a favorite movie, surfing the internet, or simply texting, consumers would certainly appreciate that the Traveling Tablet would alleviate the stress, strain, and inconvenience of constantly bending the neck and head or holding the devices while riding in a vehicle. Offered with durable, adjustable hardware that fits securely in the lap of the user, keeping the device at eye level, this versatile system would prove invaluable while traveling.

Additionally, the Traveling Tablet would eliminate the need to juggle a device in one hand while attempting to operate it with the other. Not just for tablet computers, this product could be easily employed for securing smart phones, e-readers, mp3 players, and even paperbound books. The Traveling Tablet is cost-effective to produce in the embodiments, as shown in FIGS. 1-4.

Referring to the drawings by numerals of reference there is shown in FIG. 1, a traveling tablet easel 1 supporting a tablet, a laptop or a similar article 19. Assembled from its various parts, the Traveling Tablet easel 1 comprising a padded base 2 having a rectangular block 3. The rectangular block 3 has a first long side 20, a second opposed long side 21, a first short side 22, and second opposed short side 23 each having a bottom edge 14. The rectangular block 3 further has a planar upper surface 24 and a planar bottom surface 25. The first and second planar rectangular boards 4a, 4b extend outwardly from and are attached on either side of and to a bottom edge 14 of the rectangular block 3. The first and second planar rectangular boards 4a, 4b each have a first long side 26 and a second opposed long side 27 as well as a first short side 28 and a second opposed short side 29. The first short side 28 of each planar rectangular board 4a, 4b are attached to the bottom edge 14 of the rectangular block 3 by hinges 8. The first short side 28 of the first planar rectangular board 4a is attached by a hinge 8 to the second long side 21 of the rectangular block 3. The first short side 28 of the second planar rectangular board 4b is attached by a hinge 8 to the first long side 20 of the rectangular block 3. A hollow elongated shaft 5 having a bottom end is secured to the planar upper surface 24 of the rectangular block 3. The hollow elongated shaft 5 extends upwardly from the center of the solid rectangular block 3 and terminates in an upper end. A post 6 is provided having a first end 11 and a second end 12. The first end 11 of the post 6 is matingly and frictionally received within the hollow elongated shaft 5 so as to provide for vertical adjustment within the post 6.

Figure 2:
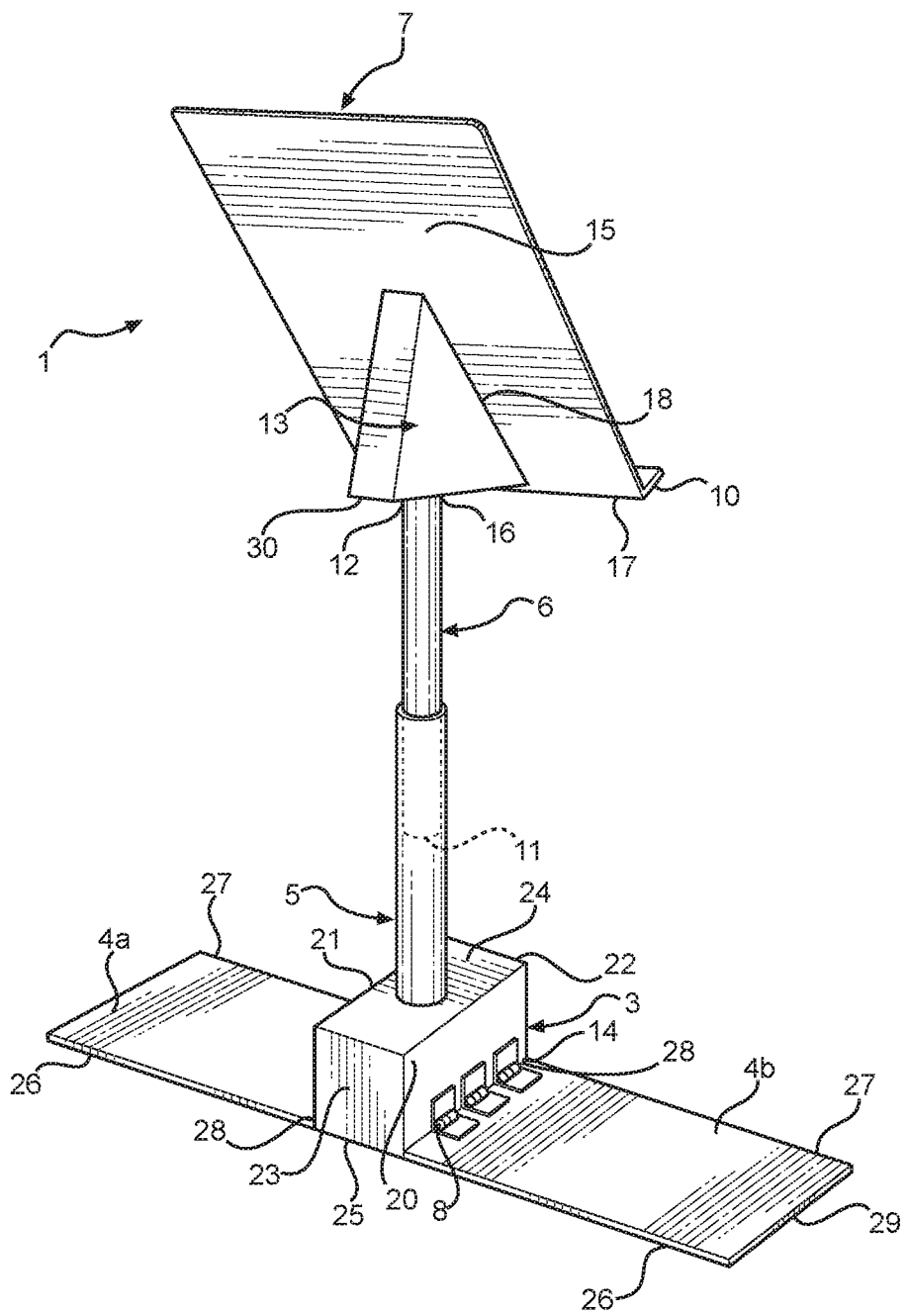
FIG. 2 shows a rear view illustrating the Traveling Tablet according to an embodiment of the present invention.

A rectangular tray 7 is provided and is composed of a planar member having a non-slip front surface 9, a rear surface 15, and a bottom end 17. Extending outwardly from the bottom end 17 is a flange defining a lip 10 which is used to further stabilize items held on the non-slip front surface 9. Referring now to FIG. 2, a triangular block 13 is secured to the rear surface 15 and generally in the center of the rectangular tray 7. The triangular block 13 is comprised of an inclined leg 18 secured to the rear surface 15 of and generally in the center of the rectangular tray 7. A horizontal bottom leg 30 of the triangular block 13 is contingent with the inclined leg 18 and generally parallel to first and second planar rectangular boards 4a, 4b of the base 2 and has an aperture 16 sized and configured to be matingly received on the second end 12 of post 6 so as to allow the rectangular tray 7 to swivel thereabout in a horizontal circle. The rectangular tray 7 is also configured to be angularly adjustable to a comfortable position for the user.

Figure 3:
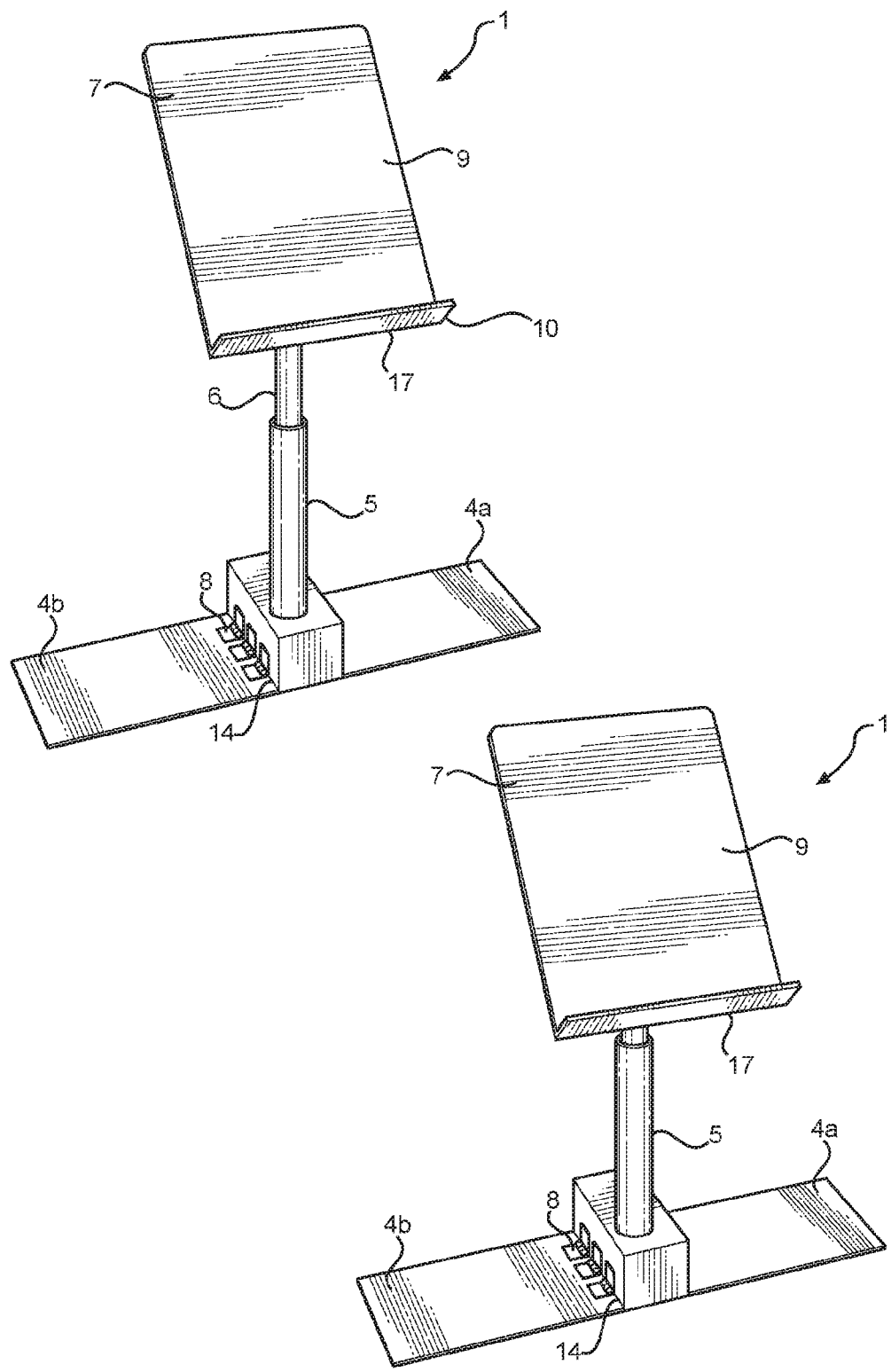
FIG. 3 is a perspective view illustrating the Traveling Tablet with vertical height adjustability according to an embodiment of the present invention.

FIG. 3 in particular shows the vertical adjustment capability of traveling tablet easel 1 wherein the post 6 is frictionally held within the hollow shaft 5 and retained in selected vertical positions as desired by the user.

Figure 4:
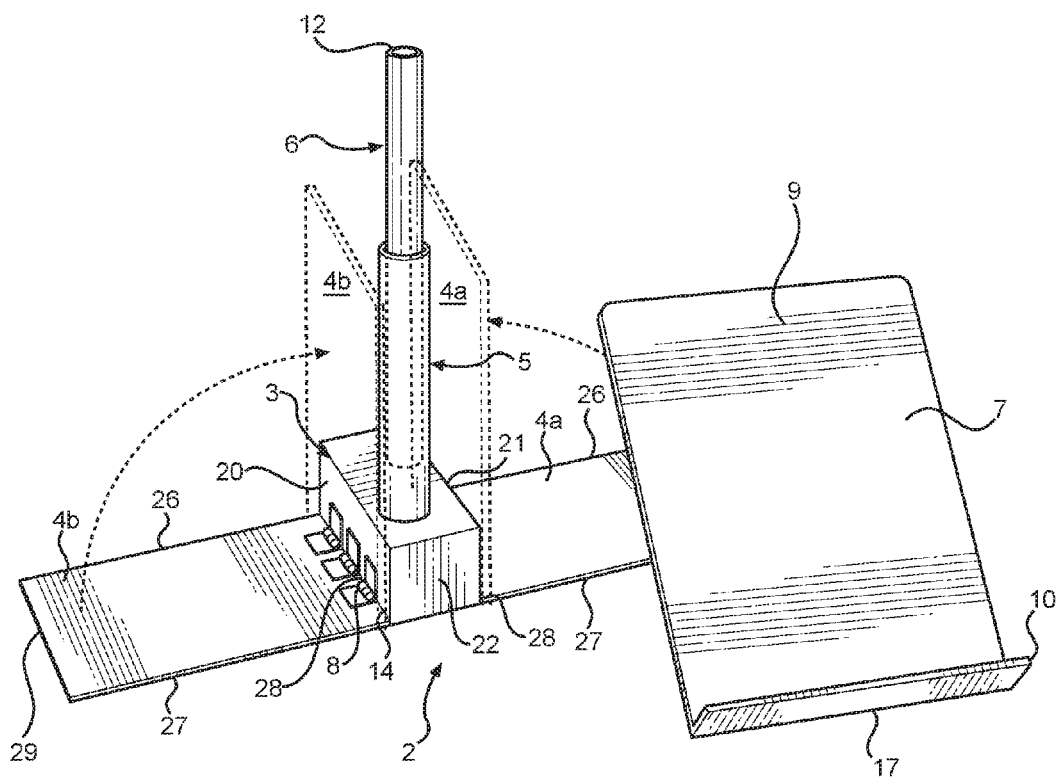
FIG. 4 is a perspective view illustrating the Traveling Tablet detached from the post according to an embodiment of the present invention. The flat boards 4a and 4b are shown in dotted lines folded up for storage and portability.

FIG. 4 shows in dotted lines that the base 2 is foldable so that the first and second planar rectangular boards 4a, 4b can pivot upwardly and be parallel to shaft 5 for the purpose of portability and ease of storage. Also as seen in FIG. 4, the tray 7 is detached from the post 6 and is used in this way on a horizontal surface. The triangular block 13 also serves to stabilize the tray 7 on the horizontal surface in an upright position when it is detached from post 6.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is sent forth in the appended claims:

1. A traveling tablet easel comprising:
    a padded base comprising;
        a rectangular block,
        first and second planar rectangular boards extending outwardly from and attached by their short sides on either long side of and to a corresponding bottom edge of said rectangular block;
    a hollow shaft extending upwardly from the center of said rectangular block,
    a post having a first end and a second end, said first end matingly received within said hollow shaft; and
    a rectangular tray having a front surface and a rear surface, said rectangular tray matingly received on the second end of said post;
    wherein said rectangular tray includes a triangular block secured to said rear surface, said triangular block having a leg that is generally horizontal and parallel to said padded base and includes an aperture for removably engaging said second end of said post and wherein said tray may be swiveled upon and removed from said second end of said post for use upon a horizontal surface and wherein said triangular block provides a stable support for use of said tray on a horizontal surface.

2. The traveling tablet easel of claim 1, wherein said first and second planar rectangular boards are hingedly attached by one of their short sides to one of each of their two long sides of said rectangular block such that a user may place a foot on each of said first and second planar rectangular boards with said post extending upwardly therebetween for ease of use and further stability of said traveling tablet easel and wherein said first and second planar rectangular boards can pivot upwardly parallel to said shaft for portability and storage.

3. The traveling tablet easel of claim 1, wherein said shaft and said post are configured to secure said tray at varying heights above said padded base.

4. The traveling tablet easel of claim 1, wherein said tray includes a non-slip surface upon said front surface for the purpose of securing a laptop or similar device.

5. The traveling tablet easel of claim 4, wherein said tray includes a lip at a bottom end thereof for the purpose of securing a bottom edge of a laptop or similar device placed upon said tray.

6. The traveling tablet easel of claim 1, wherein said traveling tablet easel has overall dimensions of fifteen and one half inches in height, thirteen and one half inches in base width, and eight inches in depth.

7. A traveling tablet easel comprising:
    a base comprising:
        a rectangular block defining first and second opposed long sides and first and second opposed short sides each having a bottom edge, a planar upper surface and a planar bottom surface;
        first and second planar rectangular boards each of which is defined by first and second opposed long sides and first and second opposed short sides;
        a first hinge secured to said first long side of said rectangular block at said bottom edge and secured to said first short side of said first planar rectangular board and configured to permit said first planar rectangular board to rotate from a horizontal position to a vertical position; and
        a second hinge secured to said second long side of said rectangular block at said bottom edge and secured to said first short side of said second planar rectangular board and configured to permit said second planar rectangular board to rotate from a horizontal position to a vertical position;
    an elongated hollow shaft having a bottom end secured to said planar upper surface of said rectangular block and extending upwardly therefrom and terminating at an upper end;
    an elongated post having a first end and an opposed second end, said first end matingly received within said upper end of said elongated hollow shaft and configured so as to provide for vertical adjustment;
    a rectangular tray comprising:
        a planar member having a front surface, a rear surface, and a bottom end; and
        a flange defining a lip secured to said bottom end of said planar member and extending outwardly therefrom; and
    a triangular block comprising:
        an inclined leg secured to said rear surface of said planar member; and
        a horizontal leg contingent with said inclined leg and having an aperture sized and configured to be matingly received on said second end of said elongated post.

8. The traveling tablet easel of claim 7, wherein said horizontal leg of said triangular block is configured so as to provide a stable support on a horizontal surface when said rectangular tray is removed from said second end of said elongated post.

9. The traveling tablet easel of claim 7, wherein said base is padded.

10. The traveling tablet easel of claim 7, wherein said rectangular tray is sheathed in a material providing a non-skid surface.

* * * * *